(No Model.)
J. LAUGHLIN.
BICYCLE.
No. 332,263. Patented Dec. 15, 1885.
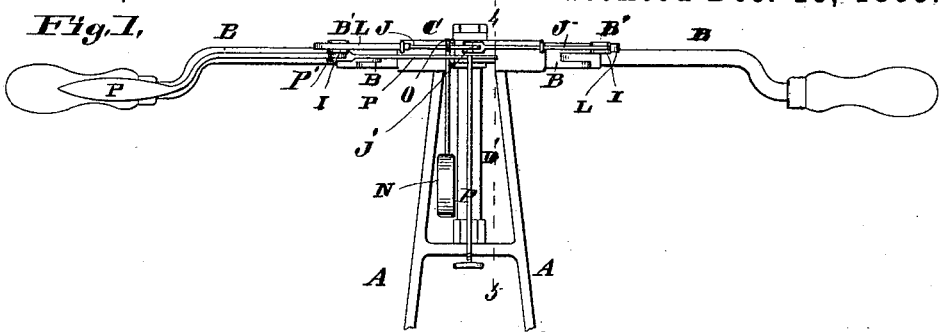
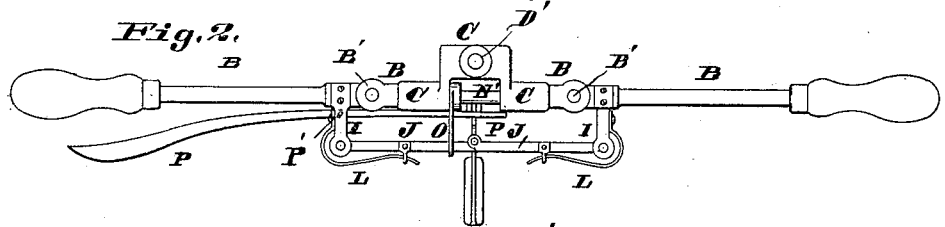
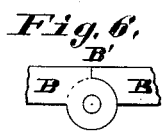
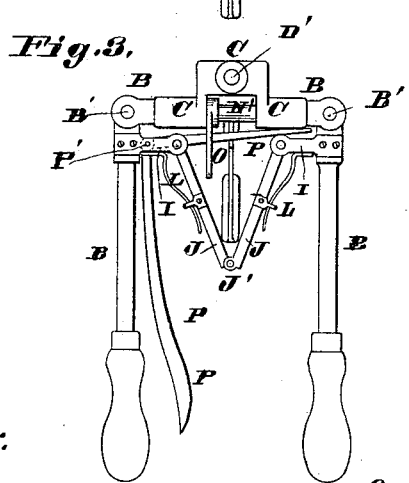
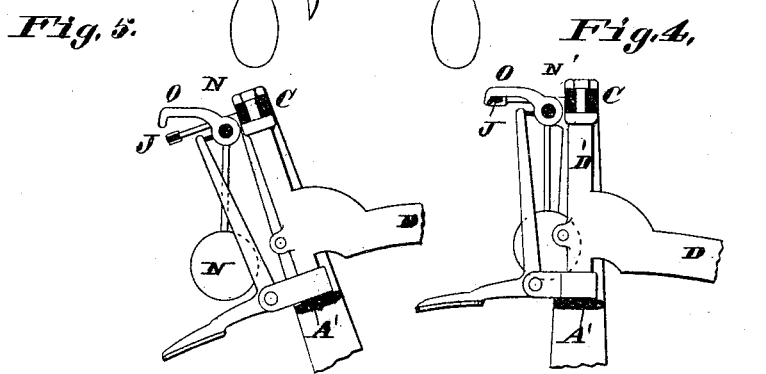
Attest:
Edmund Stew
Geo. L. Wheelock
Inventor;
Julian Laughlin
By Knight Bros
Attys
N. PETERS, Photo-Lithographer, Washington, D. C.

UNITED STATES PATENT OFFICE.

JULIAN LAUGHLIN, OF ST. LOUIS, MISSOURI.

BICYCLE.

SPECIFICATION forming part of Letters Patent No. 332,263, dated December 15, 1885.

Application filed May 1, 1884. Serial No. 130,002. (No model.)

*To all whom it may concern:*

Be it known that I, JULIAN LAUGHLIN, of the city of St. Louis, in the State of Missouri, have invented a certain new and useful Improvement in Bicycles, &c., of which the following is a full, clear, and exact description, reference being had to the accompanying drawings, forming part of this specification, and in which—

Figure 1 is a front elevation with the handles or arms extended. Fig. 2 is a top view of same. Fig. 3 is a top view with the handles or arms folded. Figs. 4 and 5 are vertical sections taken on line 4 5, Fig. 1, Fig. 5 showing the parts in the position they occupy when the bicycle is tilted forward. In both of these figures the handles or arms are removed. Fig. 6 is an enlarged detail view illustrating my preferred form of joint.

My invention relates to an improvement in bicycles, &c., whereby the handles or arms are or can be folded when the apparatus tilts forward, as more fully described hereinafter.

My invention consists in features of novelty pointed out in the claims.

Referring to the drawings, A represents the upper part of the frame or yoke of the main wheel, and B the handles or arms of the apparatus.

C represents a head to which the yoke is secured in the ordinary way.

D represents the arm or frame of the small wheel, on the end of which is a post, D', journaled at its upper end in the head C, and at its lower end in a cross piece, A', of the yoke or frame A.

The handles are made fast to the head, as usual, and they are made in two parts, each hinged together at B', preferably by rule-joints, as shown in Fig. 6; or they may be formed in one piece, each hinged directly to the head. Extending out from each arm may be a projection, I, and the projections of the two arms or handles are connected by a bar, J, hinged or pivoted to the projections, and made in two parts, jointed together by a rule or other joint at J'. Suitable springs, L, also form a connection between each projection and the two parts of the bar, as shown. Secured between the handles is a counter-balance, N, supported on a short shaft, N', journaled to the head, or by other suitable means. Connected to this counter-balance is a pawl or dog, O, that when the apparatus is in its natural position engages the bar J, as shown in Figs. 1 and 2, and holds it firm and rigid, thus holding the arms as fixed or rigid as though they were formed in one piece with the head. As soon, however, as the apparatus begins to tilt forward, as shown in Fig. 5, the handles or arms can be thrown forward into the position shown in Fig. 3, so that they will be out of the rider's way and he will not become entangled in them and injured when thrown from the apparatus, as is the case with solid handles; or, if the hinged bar, counter-balance, and pawl or dog are used, the counter-balance, when the apparatus thus tilts forward, will swing out and disengage the pawl or dog from the bar, and as soon as this takes place the springs L will throw the handles forward into the position shown in Fig. 3, and thus the handles will be automatically folded.

P represents the brake-bar, jointed at P', so as to fold with the handles.

The springs for bending the hinged bar could be dispensed with and other means employed which would accomplish the same end.

I claim as my invention—

1. A bicycle having hinged handles and a hinged brake-lever adapted to be folded, as set forth.

2. In a bicycle, the combination, with the hinged handles, of a folding bar, springs to fold the bar, and a pawl to engage the bar, as set forth.

3. In a bicycle, the combination of the hinged handles, folding bar connecting the handles, springs to fold the bar, a pawl to engage the bar, and a counterbalance-weight to control the pawl, as set forth.

JULIAN LAUGHLIN.

In presence of—
GEO. H. KNIGHT,
BENJN. A. KNIGHT.